United States Patent Office 2,978,341
Patented Apr. 4, 1961

2,978,341

GLASS COMPOSITION

Richard R. Bastian, Wheeling, W. Va., and Axel C. Ottoson, Shadyside, Ohio, assignors to Imperial Glass Corporation No Drawing. Filed Apr. 6, 1959, Ser. No. 804,143

11 Claims. (Cl. 106—50)

This invention relates to glasses of new and improved composition, being directed in a manner to result in glasses having unusually high "Young's modulus" and at the same time be glasses which can be drawn at their working temperatures into glass filaments.

This application is a continuation-in-part application of Serial No. 760,554, filed September 12, 1958, and now abandoned, for Glass Composition, by Richard R. Bastian et al.

Until fibrous glass was first used as a reinforcing medium for plastics, the "Young's modulus" was not considered to be one of the important physical characteristics of a commercial glass. Most glasses were thought to be sufficiently stiff to meet the requirements of a bottle or window plate without especially directing their composition toward high modulus properties.

With the development of fibrous glass reinforced plastics, a new material was introduced with exceptionally high strength in tension, along with excellent thermal and electrical insulating properties. However, in use in such specialized requirements as airplane construction, it was discovered that fibrous glass-plastic combinations would flex under load stress to a point which prevented their use as a structural part. At the same time the other exceptional properties of the many types of glass plastic material allowed them to be used for many parts on airplanes other than structural requirements.

This invention is the result of a large number of experimental compositions formulated toward obtaining a glass that could be attenuated into fine fibers (.0001" to .0003") at the high drawings of 8,000 to 11,000 lineal feet per minute and still have a modulus 50% to 100% higher than present commercial fibrous glass products designed for similar reinforcement of plastics. It was discovered in the course of the experiments that the oxides of beryllium, calcium, and zirconium increased the modulus of the glasses in which they were introduced. Further calcium oxide and magnesium oxide were discovered to be generally interchangeable for this purpose. The oxide of beryllium was the most effective oxide in increasing the modulus of a glass in fibrous form for an equal percent by weight. Many experiments proved that the upper limit of the percent of beryllium oxide which could be introduced in to a glass without devitrification was about 10%–12% by weight. It was demonstrated repeatedly that those glasses with a composition designed with the highest modulus had marked tendencies to devitrify at their attenuation temperatures. The crystals of devitrification formed at the tip of the orifice from which the glass was drawn into a fiber and would very effectively shut off the flow of glass in a matter of a few minutes.

It was discovered that while the above oxides increased the modulus that the oxides of sodium, potassium, and to a lesser extent, boric oxide, lowered the modulus of glasses in fibrous form. It has been discovered that the basic concept of this invention can be enhanced by substituting lithium oxide as a flux for silica to replace the common fluxes for silica of sodium and potassium oxides.

Therefore, the following formulation has been devised as the essential relationship of the preferred ingredients to produce a markedly increased "Young's modulus" in a glass suitable for the production of glass fibers under .001" in diameter:

| Material: | Percent by weight |
|---|---|
| CaO and/or MgO | 12–24 |
| $Li_2O$ | 2–6 |
| BeO | 5–12 |
| $SiO_2$—balance to make 100% but not less than 35%. | |

It is common practice in the glass industry to use commercially available raw ingredients, and to calculate the effective resultant as the oxide. This practice is adhered to in this, and all subsequent examples. It is not intended that the actual batch charge should be limited to the prepared oxides.

In the selection of proportions from the above schedule, it is, of course, within the discretion of the practitioner to balance selections with reason. The extreme limits will provide a workable glass, but the astute practitioner will recognize from this teaching that the beryllium oxide is the better agent to increase the "Young's modulus"; the practitioner is cautioned that the upper limits produce a tendency to devitrify. Hence, a further increase in the modulus will be carried out by use of the calcium or possibly the magnesium oxide. To obtain a usefully high modulus, it is necessary to augment the beryllium with either calcium or magnesium oxide, or a combination of these oxides.

It was further worked out that the tendency to devitrify in the glasses shown above was reduced by adding a small amount of cobalt oxide and at the same time improved the drawing properties of the resulting deep blue fibers of glass.

The increase in modulus in the glasses shown above was limited by the marked tendency to devitrify and the fact that glasses prepared in the composition range shown had to be handled very carefully in production of any quantity of fiber to prevent devitrification at the drawing tips. There was no limitation on the increase modulus obtained inability to melt the following compositions at temperatures below the melting temperatures of platinum vessels used to contain the molten glass and the platinum or platinum alloy orifices through which the glass flows just prior to attenuation into fibers.

Glass compositions, with the several ingredients being expressed and calculated as oxides, illustrative of this commercial version of the invention are as follows, with portions being expressed in weight percent:

*Calculated range of ingredients expressed as oxides*

| | Percent |
|---|---|
| $Li_2O$ | 1–8 |
| CaO | 10–20 |
| MgO | 6–14 |
| $TiO_2$ | 3–10 |
| $ZrO_2$ | 1–6 |
| BeO | 4–12 |
| $Co_2O_3$ | 1–5 |
| $SiO_2$—balance to make 100% (42–78). | |

The use of lithium was discovered to have a further beneficial effect, other than near elimination of the detrimental effect of sodium: It evidences a further increase in the "Young's modulus" when used in the suggested range in the presence of beryllium.

Titanium was found to aid in the commercial utilization of the basic formulation by enhancing the fiber formation.

Zirconium was discovered to raise the acceptable working temperature.

This invention is directed to an unleached glass and requires a minimum of 35% of $SiO_2$. Although known glasses have lower $SiO_2$ in the presence of beryllium, such compositions are not of usefully high "Young's modulus." This invention is a discovery of a useful inter-relationship of materials for an intended result, it is not intended to suggest that the objects may be obtained by merely adding the preferred materials which induce a high "Young's modulus."

A preferred embodiment of the invention is a composition of matter comprising basically the following ingredients, being expressed and calculated as oxides, in substantially the amounts indicated in weight percent.

*Calculated range of ingredients expressed as oxides*

| | Percent |
|---|---|
| $Li_2O$ | 4–7 |
| CaO | 12–14 |
| MgO | 7–10 |
| $TiO_2$ | 6–8 |
| $ZrO_2$ | 1–2 |
| BeO | 7–9 |
| $Co_2O_3$ | 2–7 |

$SiO_2$—Balance to make 100%.

The same general formula may also be used without the addition of cobalt oxide resulting in a high modulus glass which has excellent properties as follows:

EXAMPLE I

| | Percent |
|---|---|
| $SiO_2$ | 53.0 |
| $Li_2O$ | 3.0 |
| CaO | 16.0 |
| MgO | 11.0 |
| BeO | 8.0 |
| $TiO_2$ | 4.0 |
| $ZrO_2$ | 5.0 |

The foregoing compositions and example have been given in the usual formula manner as found in text books and other teachings and articles dealing with glass composition. Generally, a glass chemist will select a common material which occurs in nature or can be processed from raw materials of nature rather than to use chemically pure materials as indicated in the examples. Nevertheless, the example type of formula serves a definite purpose in that the formulas are understood readily rather than requiring calculation of components in a raw material batch. Nevertheless, for the purpose of the teaching of one specific embodiment, the exact batch composition of the preferred embodiment of this invention, as set forth in the above Example I, is listed in the example below:

*Batch composition*

| | Parts |
|---|---|
| Silica | 53.00 |
| Burnt dolomite [1] | 27.00 |
| Lithium titanate | 5.50 |
| Lithium zirconate | 6.21 |
| Lithium oxide hydrate | 0.85 |
| Beryllium oxide | 8.00 |

[1] Completely burned fresh dolomite having: 40.75% MgO; 59.25% CaO.

If it is desired to use cobalt oxide to obtain the above described benefits therefrom, commercial grade cobalt oxide may be added within the range of 2% to 7% to the above batch composition. Such commercial cobalt oxide is largely $Co_2O_3$ with minor amounts of other cobalt oxides.

This material is charged into a conventional glass melting furnace and is melted at a temperature within a range of 2500 to 2600 degrees Fahrenheit. Thereafter, the glass may be held in liquid form, or may be cooled in marble form and later remelted.

The temperature suitable for fiberization is rather difficult to define because it depends largely upon tip diameter, speed of attenuation, and the type of product being made. Moreover, the entire process involves a temperature gradient from around 2500 degrees in the center of the melting pot to 2100 degrees at the tips where the fiber is being formed. However it can safely be said that the actual temperature for fiberization is the tip temperature which will be about 2100 degrees Fahrenheit.

Although the invention has been described in its preferred form with a certain degree of particularity, it is understood that the present disclosure of the preferred form has been made only by way of example and that numerous changes in the details may be resorted to without departing from the spirit and the scope of the invention as hereinafter claimed.

What is claimed is:

1. Unleached glass fibers having a diameter less than .001 inch with a "Young modulus" of at least 15 million, consisting essentially of the following chemicals in the following proportions:

| Ingredient: | Parts by wt. |
|---|---|
| R oxide | 12–24 |
| Lithium oxide | 2–6 |
| Beryllium oxide | 5–12 |

Silicon dioxide—balance to make 100 parts by weight.

wherein R is selected from the group consisting of calcium, magnesium, and mixtures thereof, said glass having a melting temperature within a range of 2500 to 2600 degrees Fahrenheit.

2. Unleached glass fibers having a diameter less than .001 inch with a "Young's modulus" of at least 15 million, consisting essentially of the following chemicals in the following proportions:

| Ingredient: | Parts by wt. |
|---|---|
| Calcium oxide | 12–24 |
| Lithium oxide | 2–6 |
| Beryllium oxide | 5–12 |

Silicon dioxide—balance to make 100 parts by weight.

and said glass having a melting temperature within a range of 2500 to 2600 degrees Fahrenheit.

3. Unleached glass fibers having a diameter less than .001 inch with a "Young's modulus" of at least 15 million consisting essentially of the following chemicals in the following proportions:

| Ingredient: | Parts by wt. |
|---|---|
| Magnesium oxide | 12–24 |
| Lithium oxide | 2–6 |
| Beryllium oxide | 5–12 |

Silicon dioxide—balance to make 100 parts by weight.

and said glass having a melting temperature within a range of 2500 to 2600 degrees Fahrenheit.

4. Unleached glass fibers having a diameter less than .001 inch with a "Young's modulus" of at least 15 million, consisting essentially of the following chemicals in the following proportions:

| Ingredients: | Parts by wt. |
|---|---|
| R oxide | 12–24 |
| Lithium oxide | 2–6 |
| Beryllium oxide | 5–12 |
| Cobalt oxide | 1–5 |

Silicon dioxide—balance to make 100 parts by weight.

wherein R is selected from the group consisting of calcium and magnesium, said glass having a melting temperature within a range of 2500 to 2600 degrees Fahrenheit.

5. Unleached glass fibers having a diameter less than .001 inch with a "Young's modulus" of at least 15 million, consisting essentially of the following chemicals in the following proportions:

| Ingredients: | Parts by wt. |
|---|---|
| R oxide | 12–24 |
| Lithium oxide | 2–6 |
| Beryllium oxide | 5–12 |
| Titanium oxide | 3–10 |

Silicon dioxide—balance to make 100 parts by weight.

wherein R is selected from the group consisting of magnesium, calcium, and mixtures thereof, said glass having a melting temperature within a range of 2500 to 2600 degrees Fahrenheit.

6. Unleached glass fibers having a diameter less than .001 inch with a "Young's modulus" of at least 15 million, consisting essentially of the following chemicals in the following proportions:

| Ingredients: | Parts by wt. |
|---|---|
| R oxide | 12–24 |
| Lithium oxide | 2–6 |
| Beryllium oxide | 5–12 |
| Silicon dioxide—balance to make 100 parts by weight. | | wherein R is a combination of calcium and magnesium in the range of 10% to 20% calcium oxide, and 6% to 14% magnesium oxide, and said glass having a melting temperature within a range of 2500 to 2600 degrees Fahrenheit.

7. Unleached glass fibers having a diameter less than .001 inch with a "Young's modulus" of at least 15 million, consisting essentially of the following chemicals in the following proportions:

| Ingredient: | Parts by wt. |
|---|---|
| Lithium oxide | 1–8 |
| Calcium oxide | 10–20 |
| Magnesium oxide | 6–14 |
| Titanium dioxide | 3–10 |
| Zirconium dioxide | 1–6 |
| Beryllium oxide | 4–12 |
| Cobalt oxide | 1–5 |
| Silicon dioxide—balance to make 100 parts by weight. | | said glass having a melting temperature within a range of 2500 to 2600 degrees Fahrenheit.

8. Unleached glass fibers having a diameter less than .001 inch, said glass consisting of a silica base of at least 35% fluxed with lithia as the only alkali, and beryllium oxide in a range of 4% to 12% in the presence of calcium oxide to provide a "Young's modulus" of at least 15 million, and said glass having a melting temperature within a range of 2500 to 2600 degrees Fahrenheit.

9. A glass fiber composition as defined in claim 8 with the addition of 2% to 4% of cobalt oxide to improve workability and to assist in depressing the rate of devitrification.

10. A glass fiber composition as defined in claim 8 with the addition of 1% to 6% zirconium oxide with a resultant further increase of the modulus of elasticity and a raise of working temperature for the attenuation of glass fibers.

11. A fiber forming glass compositon consisting essentially of from 45–60% $SiO_2$, from 10–19% CaO, from 6–10% MgO, from 7–12% BeO, from 1–6% $Li_2O$, from 3–10% $TiO_2$ and from 1–3% $ZrO_2$.

References Cited in the file of this patent
UNITED STATES PATENTS

| 2,494,259 | Nordberg | Jan. 10, 1950 |
| 2,571,074 | Tiede | Oct. 9, 1951 |
| 2,877,124 | Welsch | Mar. 10, 1959 |

OTHER REFERENCES

Mellor: Treatise on Inorganic and Theoretical Chemistry, vol. 14, page 579.